United States Patent [19]
Durão et al.

[11] Patent Number: 4,743,405
[45] Date of Patent: May 10, 1988

[54] APPARATUS FOR INJECTING A GAS INTO A LIQUID FLOW

[75] Inventors: Pedro L. Durão; Adonai A. Pessoa, both of Rio de Janeiro, Brazil

[73] Assignee: Liquid Carbonic Industrias S/A, Rio de Janeiro, Brazil

[21] Appl. No.: 896,632

[22] Filed: Aug. 15, 1986

[30] Foreign Application Priority Data

Aug. 16, 1985 [BR] Brazil .................. PI68503919[U]

[51] Int. Cl.$^4$ ................................. B01F 5/04
[52] U.S. Cl. ........................ 261/76; 261/DIG. 75; 422/129
[58] Field of Search ......... 261/76, 122, 124, DIG. 75; 417/167; 422/129

[56] References Cited

U.S. PATENT DOCUMENTS

| | | | |
|---|---|---|---|
| 1,747,687 | 2/1930 | Wheeler | 261/DIG. 75 |
| 3,371,618 | 3/1968 | Chambers | 261/DIG. 75 |
| 3,409,274 | 11/1968 | Lawton | 261/76 |
| 3,927,152 | 12/1975 | Kyrias | 261/122 |
| 4,198,359 | 4/1980 | Todd | 261/124 |
| 4,215,082 | 7/1980 | Danel | 261/124 |
| 4,333,833 | 6/1982 | Longley et al. | 261/DIG. 75 |
| 4,556,523 | 12/1985 | Lecoffre et al. | 261/124 |
| 4,675,165 | 6/1987 | Kückens et al. | 261/DIG. 75 |

Primary Examiner—David L. Lacey
Attorney, Agent, or Firm—Fitch, Even, Tabin & Flannery

[57] ABSTRACT

Disclosed is an apparatus for injecting a gas such as $CO_2$ into a flowing liquid. The liquid is contained in a three-section conduit consisting of converging, bottleneck and diverging sections. The sections are joined end-to-end with different radii adjacent their inner surfaces, i.e., they are joined end-to-end without concordance radii so as to produce a turbulence effect in the liquid flowing through the conduit. An annular chamber is disposed about the bottleneck section and includes a connection for connecting to a source of pressurized gas or the like. The annular chamber is separated from the bottleneck by a wall perforated with micro-holes which allow gas entrainment into the flowing liquid. A plurality of hollow needles which extend varying amounts into the liquid flow are disposed in the wall to provide multiple sites of gas injection in the annular chamber. The arrangement is useful for neutralizing alkaline water by injecting $CO_2$ gas therein.

1 Claim, 5 Drawing Sheets

APPARATUS FOR INJECTING A GAS INTO A LIQUID FLOW

BACKGROUND OF THE INVENTION

1. Field of the Invention

This invention relates to an ejector, and in particular to an ejector useful for injecting $CO_2$ into alkaline solutions for neutralizing those alkaline solutions.

2. Description of the Prior Art

Carbon dioxide is being used as a neutralizer of aqueous alkaline solutions in lieu of strong acids.

Known processes which employ $CO_2$ show low efficiency rates of from 20 to 50% because the mixing of the gas and the aqueous solution, and consequently the reaction of the gas with the alkaline element, do not take place rapidly and are physically difficult because of the difficulties in forming a liquid-gas mixture.

This is all the more difficult as pH values become higher thereby requiring a greater flow of $CO_2$.

In addition there is a natural tendency for $CO_2$ bubbles to enter and exit a liquid such as water without a reaction having occurred.

On the other hand, the greater the size of a $CO_2$ bubble, the more difficult its reaction with water will be.

Conventional ejectors, which are devices used with the object of promoting the mixture of $CO_2$ and water, are built around Herschel type Venturi tubes which are designed almost exclusively for measuring the flow of fluids in closed ducts.

These Venturi tubes consist basically of four main sections, namely: a cylindrical entrance section, a converging section, a reduced diameter (bottleneck) cylindrical section and an exit diverging section.

FIG. 1 shows this known type of Venturi in detail.

SUMMARY OF THE INVENTION

It is an object of the present invention to achieve efficiency levels of about 90% through a perfect mixture of the two fluids, one in a liquid phase (water) and the other in a gas phase ($CO_2$), by incorporating changes into the conventional Venturi tube. These changes, based on studies of reactions between the liquid and the gas phase, properties of solutions and their alkaline components, have made it possible to develop a new type of ejector which is the subject of this invention.

These and other objects of the present invention which will become apparent from studying the appended description and claims are provided in an ejector for use in a process for the neutralization of an aqueous alkaline solution with $CO_2$ gas, comprising: a converging section which promotes an increase of speed of the aqueous alkaline solution by transfer thereof from one section of larger diameter to one of smaller diameter; an intermediate section in which the liquid-$CO_2$ reaction takes place; and a diverging section in which the turbulent mixture regime between the liquid phase and the $CO_2$ in gas form occurs, the neutralization reaction being complemented by the mixture.

The converging, bottleneck, and diverging sections are separately formed and joined end-to-end without concordance radii to produce a turbulence effect in the liquid flowing through the ejector.

An annular chamber is disposed about the bottleneck section and provides connection to a source of pressurized gas. A wall separating the annular chamber and the interior of the ejector defines a plurality of micro-holes which allow the injection of the gas into the liquid flow. Also disposed in the wall is a plurality of hollow needles inclined in the direction of fluid flow and extending varying amounts into that flow. The hollow needles provide additional sources of gas injection into the liquid flow.

BRIEF DESCRIPTION OF THE DRAWINGS

The present invention will now be described by way of example only, with reference to the accompanying drawings, in which.

DETAILED DESCRIPTION OF THE PREFERRED EMBODIMENT

Figure 1:
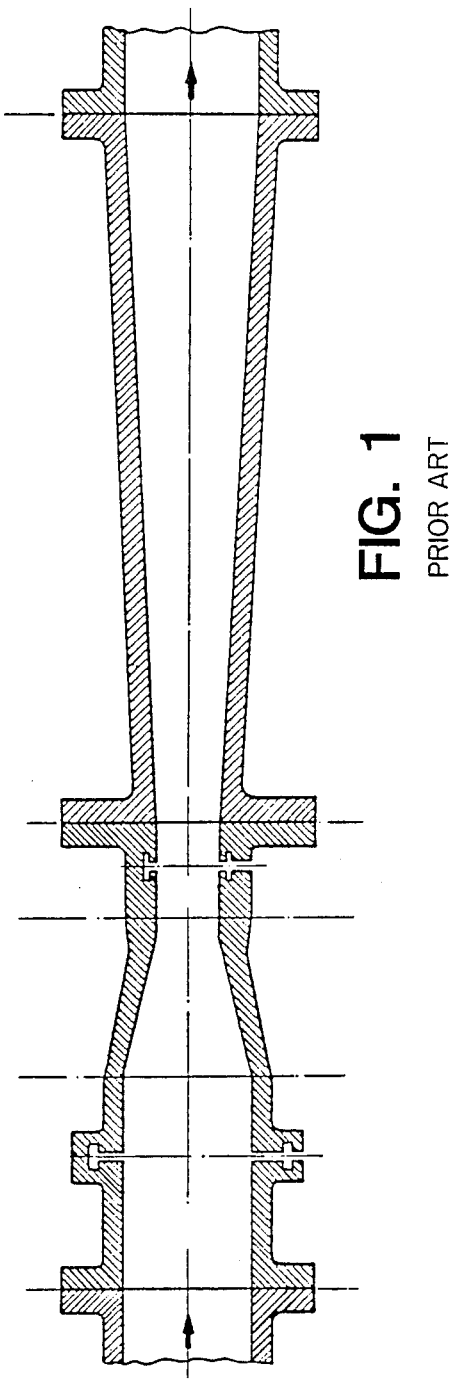
FIG. 1 shows a cross section through a conventional Venturi tube.
Figure 2:
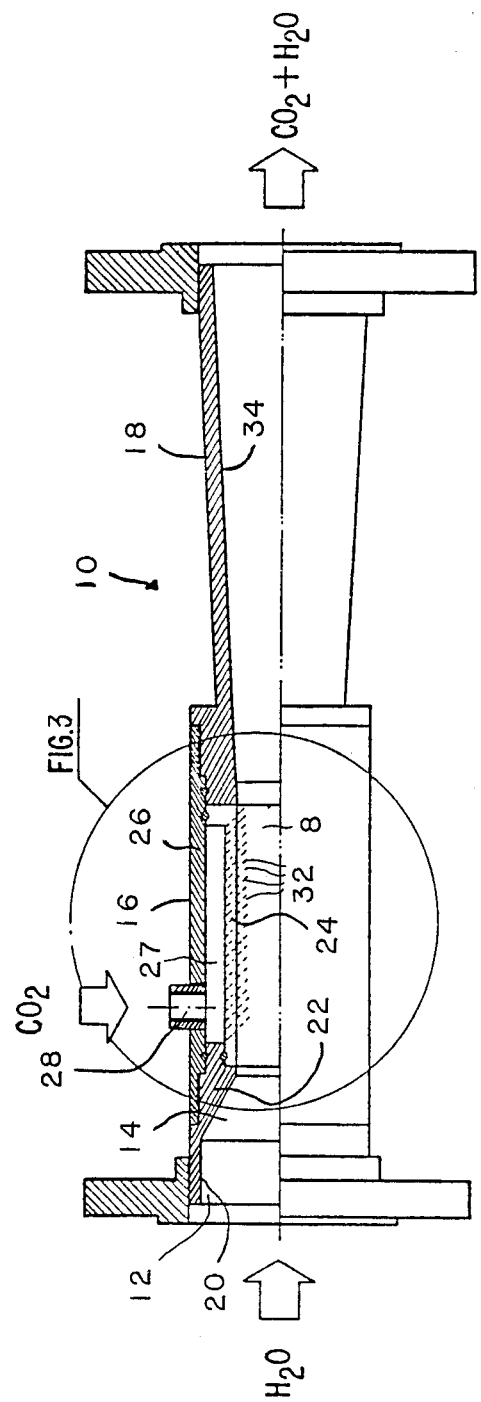
FIG. 2 is a side elevational view, partly in cross-section, of an ejector in accordance with the present invention.
Figure 3:
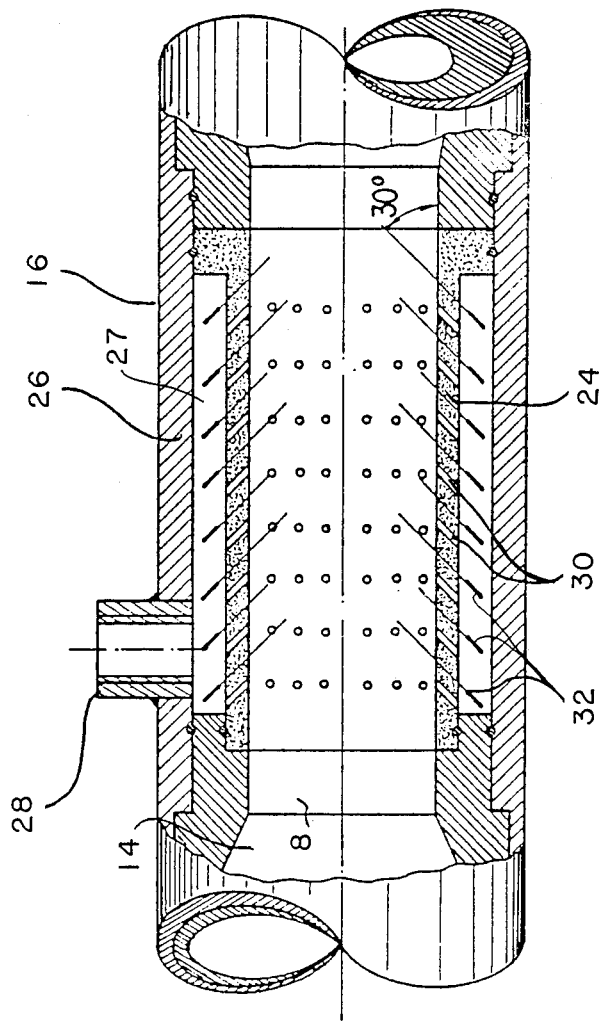
FIG. 3 is an enlarged fragmentary view, partly in cross-section, of the ejector of FIG. 2.

Referring to FIGS. 2 and 3, an ejector 10 comprises, in turn, a cylindrical entrance section 12, a converging section 14, bottleneck-like intermediate section 16 and a diverging exit section 18. The cylindrical entrance section 12 comprises an annular wall 20 which is integral with the converging section 14 which comprises an inwardly converging circumferential wall 22. The intermediate section 16 comprises an inner tubular member or bottleneck section 24 and an outer tubular member 26 which are coaxial. The outer tubular member 26 surrounds the bottleneck section 24 thereby to define an annular chamber 27 therebetween. The outer tubular member 26 is provided with a threaded coupling 28 for connection to a source of carbon dioxide. The bottleneck section 24 has a number of holes 30 drilled therethrough distributed over the area of the bottleneck section 24. Each hole 30 has an approximate diameter of from 0.5 to 0.6 mm and is inclined generally at an angle of 60° to the longitudinal axis of the ejector 10.

A plurality of hollow needles 32 extend from the chamber 27 through the bottleneck section 24 and into the central cavity 8 of the ejector 10. The hollow needles 32 are also inclined to the longitudinal axis of the ejector and at the same angle thereto as the holes 30. As is shown in FIG. 3, each hollow needle 32 is inclined at an angle of approximately 30° to the direction of the flow of water through the ejector. The hollow needles have an internal diameter of approximately 0.3 mm and alternate lengths ranging from approximately 25 to approximately 30 mm.

The entrance end of the intermediate section 16 is connected to the converging section 14. The exit end of the intermediate section 16 is connected to the diverging exit section 18 which comprises an outwardly diverging annular wall 34.

Figure 4:
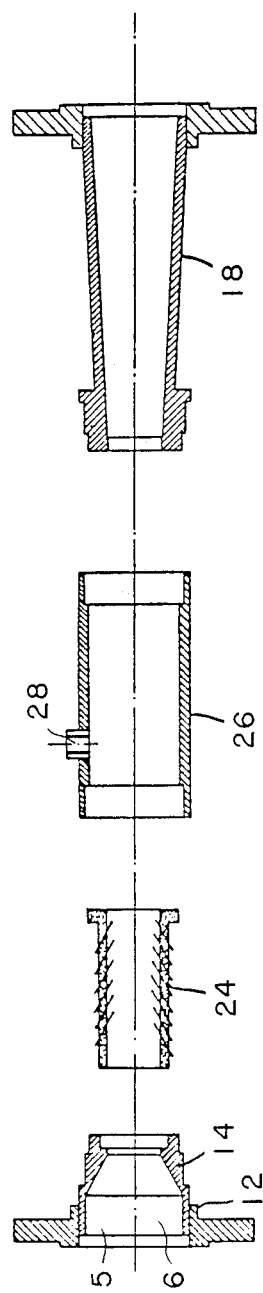
FIG. 4 is an exploded cross-sectional view of the ejector of FIGS. 2 and 3.

The ejector 10 is constructed in four separable parts for ease of maintenance and cleaning—an important feature in light of the severe operating conditions to which the ejector is subjected. The four separable parts, shown in FIG. 4, include a first part 1 comprising the cylindrical entrance section 12 and the converging section 14, a second part 2 comprising the bottleneck section 24 of the intermediate section 16, a third part 3 comprising the outer tubular member 26 of the intermediate section 16, and a fourth part 4 comprising the diverging exit section 18.

Figure 5:
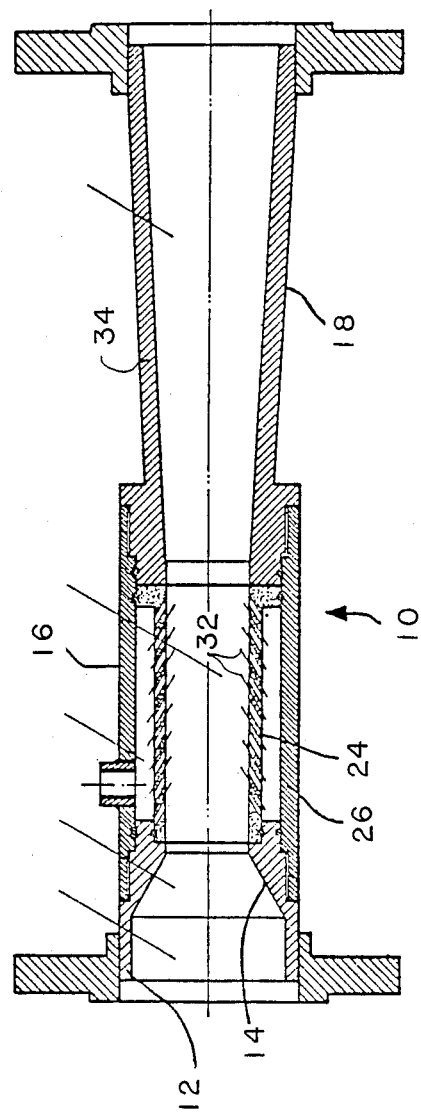
FIG. 5 is a cross-sectional view of the assembled ejector of FIGS. 2-4, preceding

FIG. 5 shows the cavities present in the ejector 10 of the present invention. At the input end of the ejector is a cylindrical cavity 5 defined by the cylindrical entrance section 12. Adjacent to the cylindrical cavity 5 is a converging frustoconical cavity 6 defined by the converging section 14. An annular cavity 27 is defined between the inner and outer tubular members, 24, 26. The intermediate section 16 defines a reduced diameter (bottleneck) central cavity 8 and the diverging section defines a diverging frustoconical cavity 9.

In developing the ejector of the present invention, changes were made in the conventional Venturi tube with a view to achieving efficiency rates of approximately 90%. The following basic changes are especially noteworthy:

First change: all concordance radii between the couplings of the following sections were eliminated so as to provide different radii at the inner surface of the couplings: cylindrical entrance section 12, converging section 14, intermediate section 16 and diverging exit section 18. This has made it possible to produce a turbulence effect inside the ejector 10.

Second change: the chamber surrounding the entire bottleneck section 24 has been adapted to the system. This chamber provides an entry for $CO_2$ via the threaded coupling 28, as is shown in FIGS. 2 and 3.

Third change: the ejector bottleneck section 24 is constructed of an easily-ground material, such as a synthetic resin polymer of the type sold under the trademark Teflon mixed with a glass fiber product such as that sold under the trademark Fiberglas, in order to allow the successful drilling therethrough of the micro-holes 30 having a diameter of from 0.5 to 0.6 mm. These micro-holes 30 are distributed over the entire area of the bottleneck section 24 and inclined at an angle of 60° to the direction of the flow of the water inside this section of the ejector 10.

Fourth change: along with the micro-holes 30 of a diameter from 0.5 to 0.6 mm, distributed over the entire area of the bottleneck cylindrical section 24 also includes needles 32 which have an internal diameter of 0.3 mm and alternate lengths ranging from 25 to 30 mm. These needles are also inclined at an angle of 30° in the direction of the flow of water. The main purpose of the presence of these needles 32 and of the micro-holes 30 is to promote the injection of $CO_2$ at different points of the cross section of the water flow through the bottleneck section 24.

The ejector developed is composed basically of three sections; the first of which is converging section 14, which provides a gain in water speed, since the liquid passes from a larger diameter section into one of lesser diameter. The second section, intermediate section 16 is the location where the gas-liquid reaction takes place.

The $CO_2$ injection takes place through micro-holes 30 located on the surface of the bottleneck section 24, preferably formed of Teflon, and also through needles 32 located at an angle of 30° to the surface of the bottleneck section 24, promoting and materially increasing the gas-liquid mixture and consequently the neutralizing reaction.

The micro-holes 30 located on the surface inject gas towards the larger diameter area of the water flow passing through the ejector 10, while the needles 32 inject the gas radially from the center of flow. In the third section, diverging section 18, the turbulent mixture of the liquid and gas phase occurs, with the neutralizing reaction being completed by the mixture.

The ejector is sized in accordance with the water flow of the system.

The ejector which is the subject of this invention is a static item, that is, it has no moving parts, but rather uses kinetic energy from the water flow provided by a centrifugal pump to effect the gas-liquid mixture.

The effluent enters the cylindrical entrance section, and is thereafter bottlenecked in the converging section of the ejector. This allows a reduction in static pressure and an increase in speed of flow of the effluent.

This speed reaches its maximum point in the reduced cylinder (bottleneck) section of the ejector and is determined by the formula:

$$V = Q/A \therefore V = 353.67 Q/d^2 \qquad (1)$$

where:
V=speed of the effluent in the reduced diameter (bottleneck) cylindrical section of the ejector, in meters per second (m/s).
Q=flow of the effluent through the ejector, in cubic meters per hour (m³/h).
A=internal diameter of the reduced diameter (bottleneck) cylindrical section of the ejector is millimeters (mm).

The speed of 17±3 m/s was empirically determined to provide the greatest mixture efficiency. The smaller diameters of gas bubbles and greater gas/liquid interaction provided by the present invention promote efficiency of reaction to 90±5% (in relation to theoretical figures) of the gas injected with alkaline substances present in the water.

The following results were obtained for a soda-alkaline system. Injection of $CO_2$ at a pressure of about $2.7 \times 10^5$ to $5.5 \times 10^5$ N/m² (2.7 to 5.5 bar) takes place in the reduced cylinder (bottleneck) section of the ejector, resulting in a more even mixture of gas and effluent.

Due to the high speed of the effluent the gas bubbles are reduced to diameters of the order of microns in size and, from their point of injection are distributed along the cross-section of the flow through the micro-holes and the radially positioned needles.

After receiving the $CO_2$ injection in the reduced cylinder intermediate section 16, the water flow passes into the diverging section 18. In the diverging section the flow of water undergoes a loss of speed and recovery of static pressure, creating an area of great turbulence and promoting the efficient mixture of the liquid and gas phases, which is facilitated by the presence of $CO_2$ in the form of micro-bubbles distributed over the entire flow section.

The formula shown below is used to determine flows through Venturi tubes, as specified in FLUIDS METER, THEIR THEORY AND APPLICATIONS-ASME Sixth Edition, 1971.

$$Q = 358.93 \, C.E.Y.d^2 Fa \sqrt{\rho H_2 O \cdot h_w} \, (\text{lb/h}) \qquad (2)$$

where:
Q=flow of water through the ejector (lb/h)
C=discharge coefficient, including the effect of the needles=0.85.
E=speed factor=$1/\sqrt{1-\beta^4}$, where β = ratio between diameters d/D (see below)
Y = expansion factor, which, for liquids, has a value of 1.
Fa = thermal expansion factor = 1 (depending on the material used).
$\rho H_2O$ = specific gravity of water = 62.427 lb/ft³
d = diameter of the ejector bottleneck (in)
D = internal diameter of the ejector entrance (in)
$h_w$ = differential pressure between pressure at the entrance to the ejector and pressure in the bottleneck (in)
ΔP = differential pressure in psig When formula (2) is modified to find the flow in metric units for the various types of ejectors according to the present invention, the result is:

$$Q_{H_2O} = 0.023 C.E.d^2 \sqrt{\Delta p} \; (m^3/h) \quad (3)$$

where:
Q = flow of the effluent through the ejector in in m³/h.
C = discharge coefficient (depending on the ejectors and as adjusted in practice).
$E = 1/\sqrt{1-\beta^4}$ (non-dimensional)
d = internal bottleneck diameter (mm)
β = ratio between diameters d/D
D = internal diameter of the entrance of the ejector (mm)
Δp = differential pressure between entrance pressure and bottleneck pressure (psig)

It is very important that in the area of the ejector through which the $CO_2$ gas is injected (ie. the intermediate portion 16) the speed of the water be as high as possible. Of course this speed is limited by the dimensions of the ejector and the power needed for pumping water through the ejector.

Water passing at high speed through the bottleneck prevents the gas in contact with the bottleneck appearing as macro-bubbles.

Thus, the speed of the water, the even distribution of the gas, the diameters and location of the micro-holes, and the use of needles to inject the gas all combined to provide a perfect homogenization of the gas and liquid components, wherein the gas is in the form of thousands of micro-bubbles.

As a result, a more efficient use of the injected gas is achieved, making possible the reaction of the gas with alkaline substances dissolved in the water.

The formula for calculating the speed through the bottleneck is as follows:

$$V = Q/A \therefore V_{H_2O} = 353.67 Q/d^2, \quad (4)$$

where
$V_{H_2O}$ = Speed of $H_2O$ in the bottleneck of the ejector (m/secs)
Q = Flow of the water through the ejector (m³/h)
d = internal diameter of the bottleneck (mm)

The following table shows the velocities for four different sizes of ejector sections.

| EJECTOR | d(mm) | D(mm) | β | C | E |
|---|---|---|---|---|---|
| ⌀ 1½" | 19.0 | 40.9 | 0.464 | 0.95 | 1.024 |
| ⌀ 2" | 26.9 | 52.5 | 0.512 | 0.95 | 1.036 |
| ⌀ 3" | 40.0 | 77.9 | 0.513 | 0.90 | 1.037 |
| ⌀ 4" | 60.0 | 102.0 | 0.588 | 0.90 | 1.065 |

Pressure

-continued

| EJECTOR | ΔPpsig | Drop(psig) | $Q_{(m^3/h)}$ | $V_{m/sec}$ |
|---|---|---|---|---|
| ⌀ 1½" | 5 | 22% $\Delta_p$max | =18 | =17.60 |
| ⌀ 2" | 5 | 22% $\Delta_p$max | =36 | =17.60 |
| ⌀ 3" | 5 | 25% $\Delta_p$max | =77 | =17.00 |
| ⌀ 4" | 5 | 25% $\Delta_p$max | =177 | =17.40 | where:

β = d/D;

$Q = 0.023 CEd^2 \sqrt{\Delta p}$;

$E = 1/\sqrt{1-\beta^4}$;

and $V = 353.67 Q/d^2$.

The efficiency of the chemical reaction to neutralize alkaline effluents with $CO_2$ depends closely on the degree of interaction of the liquid and gas phases. This is particularly important when the concentration of the alkaline substance is at very low levels, consequently requiring smaller quantities of $CO_2$.

For the neutralization to take place under such conditions it is essential that the gas be dispersed in the form of micro-bubbles through the entire volume taken by the flow of the water.

By the use of this type of ejector which is recommended by the practical results recorded, a high reaction efficiency, of about 90% of the theoretical consumption of gas, has been achieved in neutralizing alkaline effluents with $CO_2$.

We claim:

1. Apparatus for injecting gas into a liquid flow, comprising:
    a conduit for containing a flowing liquid, said conduit including in sequence, separate converging, bottleneck, and diverging sections, said converging section having a fluid-receiving inlet and said converging, bottleneck and diverging sections joined end-to-end without concordance radii between the sections, to produce a turbulence effect in liquid flowing through said conduit, said converging section increasing the rate of flow of liquid from a point upstream of the converging section, and said bottleneck section having a reduced diameter compared to that of the converging section;
    a generally cylindrical outer wall having upstream and downstream ends joined to said converging and diverging sections, respectively, said outer wall disposed about said bottleneck section so as to form therewith an annular chamber elongated in the downstream direction, said outer wall having means for connection to a pressurized source of gas for introducing the gas into the chamber;
    said bottleneck section further including a wall defining a portion of said annular chamber, said wall containing a plurality of needle-mounting holes extending therethrough and inclined in the downstream direction; and
    a plurality of rigid hollow needles mounted in said wall generally throughout the length of said chamber, said needles inclined in the downstream direction and extending varying amounts into the interior of the bottleneck section so as to inject gas from said chamber at different points within the liquid flow.

* * * * *